United States Patent [19]

Snijders et al.

[11] 4,362,909

[45] Dec. 7, 1982

[54] ECHO CANCELER WITH HIGH-PASS FILTER

[75] Inventors: Wilfred A. M. Snijders; Nicolaas A. M. Verhoeckx; Petrus J. van Gerwen, all of Eindhoven, Netherlands

[73] Assignee: U.S. Philips Corporation, New York, N.Y.

[21] Appl. No.: 142,304

[22] Filed: Apr. 21, 1980

[30] Foreign Application Priority Data

May 14, 1979 [NL] Netherlands ....................... 7903759

[51] Int. Cl.³ .............................................. H04B 3/24
[52] U.S. Cl. ................................................ 179/170.2
[58] Field of Search ................ 179/170.2, 170.6, 170.8

[56] References Cited

U.S. PATENT DOCUMENTS

| | | | |
|---|---|---|---|
| 3,499,999 | 3/1970 | Sondhi | 179/170.2 |
| 3,508,017 | 4/1970 | Unrue, Jr. | 179/170.2 |
| 3,560,669 | 2/1971 | Foulkes et al. | 179/170.2 |
| 3,778,722 | 12/1973 | Stein | 179/170.8 |
| 3,836,734 | 9/1974 | Campanella et al. | 179/170.2 |
| 4,162,378 | 7/1979 | Baudoux et al. | 179/170.2 |

OTHER PUBLICATIONS

B. Aschrafi, G. Bostelman and K. Szechenyi; "Results of Experiments with a Digital Hybrid in Two-Wire Digital Subscriber Lops," NTG-Fachber (Germany), vol. 73 (1980), pp. 21-25.

Primary Examiner—G. Z. Rubinson
Assistant Examiner—Randall P. Myers
Attorney, Agent, or Firm—Thomas A. Briody; William J. Streeter; Edward W. Goodman

[57] ABSTRACT

Echo canceler for use in a data transmission system, comprising two and four-wire connections and arranged to suppress echo signals occurring in the four-wire connection. This echo canceler is provided with an adjustable signal processing device to which the data signal to be transmitted is applied and which produces a synthetic echo signal. A signal formed by a received data signal and an echo signal is present in the receive path of the four-wire connection. From the signals in the receive path there is now subtracted the synthetic echo signal, in order to generate a residual signal.

To adjust the signal processing device an adjusting device is connected thereto to which a digital control signal is applied, which is constituted by a digital version of the residual signal.

In order to improve the quality of the residual signal which is obtained when the data signal to be transmitted comprises long trains of data symbols of the same type the residual signal is subjected to a high-pass filter operation and the digital version of the residual signal filtered thus is applied to the adjusting device as the control signal.

2 Claims, 7 Drawing Figures

ECHO CANCELER WITH HIGH-PASS FILTER

A. BACKGROUND OF THE INVENTION (1) Field of the Invention

The invention relates to an echo canceler, particularly for use in a data modem for simultaneous two-way transmission of data signals on two-wire connections.

(2) Description of the Prior Art

Modern transmission systems usually consist of a combination of two and four-wire connections. Four-wire connections consists of two one-way paths, namely a one-way transmit path and a one-way receive path. A two-wire connection is formed by a two-way path on which signals can be simultaneously transmitted in mutually opposite directions in one and the same frequency band. These different paths are interconnected by means of a hybrid.

As known, a hybrid is formed by a four-port circuit. A first port, the so-called transmit port, is connected to the one-way transmit path, a second port, the so-called receive port, is connected to the one-way receive path, a third port, the so-called cable port is connected to the two-way path and a balancing network is connected to the fourth port, the so-called balancing port. This balancing network is intended to match the hybrid to the cable impedance. With perfect adjustment of this balancing network, a signal in the transmit path will appear at the cable port, but not in the receive path. If, on the contrary, a signal is applied to the cable port on the two-way path, this signal will appear in the receive path but not in the transmit path.

As each two-way path contains one or more discontinuities from which a signal can reflect, a reflected version of the signal occurring in the transmit path may be expected in the receive path.

Owing to the various cable lengths and cable types the cable impedance is usually not precisely known so that the balancing network can never be perfectly adjusted. The result is that a portion of the signal occurring in the transmit path will also find its way into the receive path via the hybrid.

The portions of the signal present in the transmit path which occur in the receive path in the above-described manner will, as customary, be called, echo signal.

Such echo signals have a particularly bad influence on the quality of the signal in the receive path. In order to improve this quality, circuits have been designed to cancel the echo signals or to reduce, at least, their influence as much as possible. These circuits are known as echo cancelers.

As will be apparent from references 1, 2 and 3 of paragraph D an echo canceler usually comprises:

an adjustable signal processing device coupled to the one-way transmit path;

a difference producer connected to the one-way receive path for generating a residual signal indicating the difference between the signal occurring in the receive path and the signal produced by the signal processing device;

an adjustable device responsive to control signals for adjusting the signal processing device; and a control signal generator for generating the said control signals and which is responsive to the said residual signal.

In response to a signal which occurs in the transmit path, the signal processing device generates a synthetic echo signal, whose shape corresponds as closely as possible with the echo signal to be expected. The degree of agreement between synthetic echo signal and real echo signal is determined by the setting of the signal processing device, which is catered for by the adjusting device. This adjusting device, to which the output signal of the control signal generator is applied, is constructed so that it is capable of deriving from the residual signal a signal which is a measure of the non-suppressed echo signal present in the residual signal, the so-called residual echo, and of adjusting the signal processing device such, by means of this signal in an iterative manner, such that a minimum value of the mean-square value of the residual echo is obtained.

As indicated in the references 1, 2 and 3 the control signal generator is usually formed by an analog-to-digital converter to which the residual signal is applied and which converts this residual signal into a digital signal. For this conversion the residual signal is first sampled with a suitable sampling frequency. When this echo canceler is used in a datum modem which is arranged for transmitting and receiving data signals which are formed by a sequence of data symbols occurring at a symbol rate $1/T$ the sampling frequency may also be made equal to $1/T$ (see reference 1).

The signal processing device is preferably in the form of a non-recursive digital filter, whose filter coefficients are determined by the adjusting device (see the references 1 and 3).

The adjusting device comprises a digital correlator which includes a multiplying device and an accumulator. Applied to this multiplying device are the input signal of the signal processing device and the control signal. The output signal of this multiplying device is applied to the accumulator. The content of this accumulator now constitutes the desired filter coefficient which is non-destructively read at the symbol rate $1/T$.

Although these prior echo cancelers operated satisfactorily, a considerable increase in the quality of the residual signal appears to be possible, namely by constructing the signal processing device as an interpolating digital filter (see the references 4 and 5) having an interpolation factor M. M will usually represent a positive integer. The consequence thereof is that also the sampling pulses applied to the analog-to-digital converter must occur at a frequency $M/T$.

B. SUMMARY OF THE INVENTION

It is an object of the invention to provide in a simple manner a further improvement in the quality of the residual signal.

According to the invention a high-pass filter is therefore included in the control signal generator, arranged in cascade with the analog-to-digital converter.

The invention is the result of experiments wherein Applicants found that the quality of the residual signal was not constant, but could momentarily decrease very greatly. From further experiments it was apparent that this reduction in quality is connected with the fact that long trains of data symbols which are all of a first type (for example they are all "1") can occur in the data signal present in the one-way transmit path.

Such a train of identical data symbols may be considered as a direct current signal. This direct current signal is now correlated with any other direct current signal occurring at the output of the control signal generator. The last-mentioned direct current signal is, for example, the result of drift phenomena and offset in the echo canceler and in its peripheral equipment. These direct current signals appear to cause a considerable change in the content of the accumulator in the correlator and, consequently, in the value of the filter coefficient; this change is, however, not required by the echo signal. This causes the value of the residual echo to increase to a very high extent.

C. SHORT DESCRIPTION OF THE FIGURES

D. REFERENCES

1. Arrangement for simultaneous two-way data transmission over two-wire circuits, Netherlands patent application No. 7,607,037, U.S. Pat. No. 4,117,277.

2. An adaptive echo canceler in a nonideal environment (nonlinear or time variant); E. J. Thomas; *The Bell Systems Technical Journal*, Vol. 50, No. 8, October 1971; pages 2779-2795, particularly FIG. 1, page 2781.

3. Echo canceler with adaptive transversal filter utilizing pseudo-logarithmic coding; O. A. Horna; *Comsat Technical Review*, Vol. 7, No. 2, Fall 1977, pages 393-428.

4. Pass-band data-driven echo canceler for full-duplex transmission on two-wire circuits—S. B. Weinstein; *IEEE Transactions on Communications,* Vol. COM-25, No. 7, July 1977, pages 654-666.

5. Digital echo canceler for a modem for data transmission by means of modulation of a carrier; Netherlands patent application, No. 7,804,408, U.S. Pat. No. 4,162,378.

6. A new digital echo canceler for two-wire full-duplex data transmission, K. H. Müller; *IEEE Transactions on Communications,* Vol. COM-24, No. 9, September 1976, pages 956-962.

7. Arrangement for converting discrete signals into a discrete single-sideband frequency division-multiplex signal and vice versa, Netherlands patent application No. 7,703,633, U.S. Pat. No. 4,131,764.

8. Low-pass nonrecursive digital filter; Netherlands patent application No. 7,400,761, U.S. Pat. No. 3,928,755.

9. Parallel realizations of digital interpolation filter for increasing the sampling rate; H. Urkowitz; *IEEE Transactions on Circuit and Systems,* Vol. CAS-22, No. 2, February 1975, pages 146-154.

10. Nine digital filters for decimation and interpolation; D. J. Goodman, M. J. Carey; *IEEE Transactions on Acoustics, Speech and Signal Processing,* Vol. ASSP-25, No. 2, April 1977, pages 121-126.

E. DESCRIPTION OF THE EMBODIMENTS (1) Construction

Figure 1:
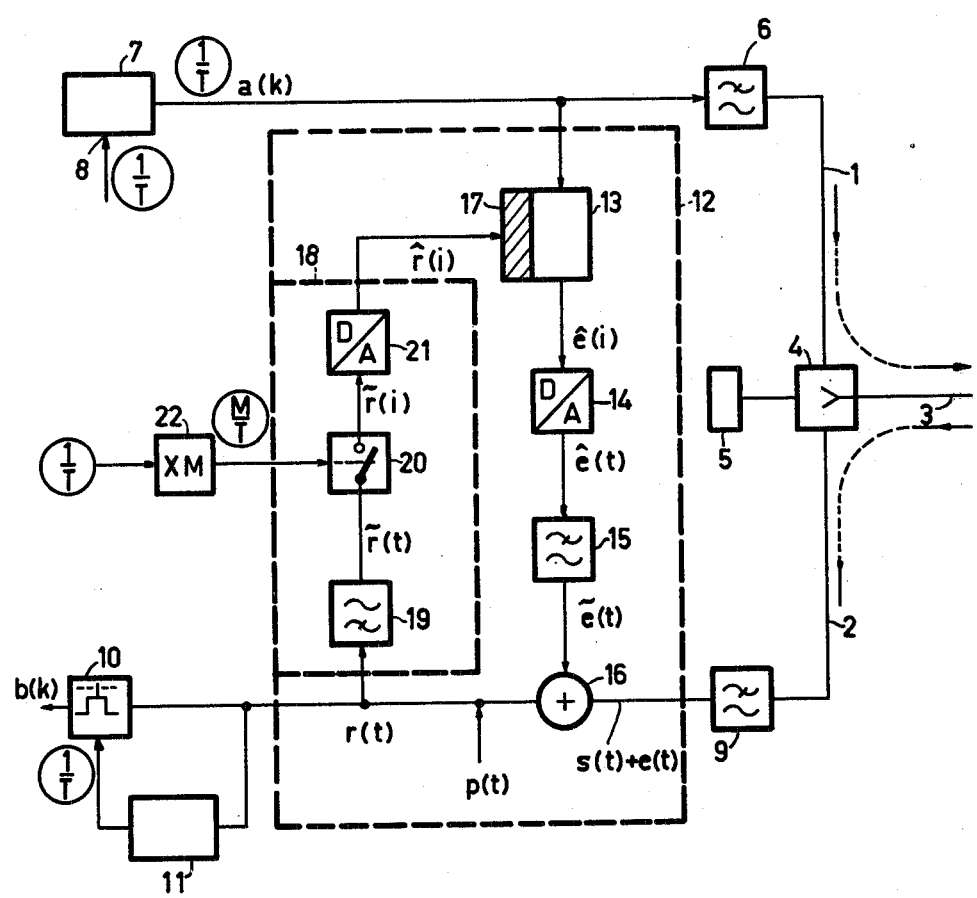
FIG. 1 shows schematically a portion of a data transmission system.

FIG. 1 shows schematically by means of a block circuit a portion of a data transmission system. This system consists of a one-way transmit path 1, a one-way receive path 2, as well as of a two-way path 3. These different paths are interconnected by means of a hybrid 4, a balancing network 5 also being connected to this hybrid to match the impedance of this hybrid to the impedance of the two-way path.

In the transmission system shown the transmit path 1 comprises a low-pass filter 6. A data source 7 which produces the data symbols a(k) is connected to the input of this transmit path. The quantity k in these symbols represents the number of the data symbol. These data symbols occur at a frequency 1/T. To this end a clock signal is applied to this data source via a clock signal input 8. The pulse repetition frequency of this clock signal is also 1/T.

In the embodiment shown, the one-way receive path 2 comprises a low-pass filter 9 and a pulse regenerator 10. At the output of the low-pass filter 9 there occurs a signal s(t) which represents a filtered analog version of a data signal consisting of the data symbols b(k), which have been transmitted by a remote data source via the two-way path 3 to the hybrid 4, which applies these data symbols to the one-way receive path 2. These data symbols are also assumed to occur with a frequency 1/T. Therefore, the pulse regenerator 10 is controlled by a clock signal the pulse repetition frequency of which is equal to 1/T. The data symbols b(k) occurring with this frequency 1/T are now obtained at the output of the pulse regenerator 10.

The clock signal which is applied to the pulse regenerator 10 is regenerated by a clock extraction circuit 11 which is coupled to the receive path 2 and which derives this clock signal in a conventional manner from the signals occurring in this receive path 2. If this clock signal is also applied to the clock signal input 8 of the data source 7, the transmission system shown is called a "homochronous" system. If, however, the clock signal applied to the clock signal input 8 of the data source 7 is generated by a separate clock signal generator the transmission system is called a "plesiochronous" system.

As in practice the impedance of the two-way path 3 is not accurately known, the balancing network does not constitute a perfect termination of the hybrid 4, which results in a direct leakage from transmit path 1 to receive path 2 via this hybrid and in signal reflections. In addition, impedance discontinuities in the two-way path 3 also result in signal reflections. Both effects cause echoes of the output signal of the low-pass filter 6 to appear in the receive path 2. Those echo signals occurring at the output of the low-pass filter 9 will be denoted by e(t).

In order to eliminate the disturbing influence of these echo signals as much as possible, the transmission system shown in FIG. 1 comprises an echo canceler 12 which includes an adjustable signal processing device 13 connected to the one-way transmit path 1. This signal processing device 13 can be constructed in a conventional manner as a digital filter having adjustable filter coefficients, preferably as a non-recursive digital filter (see, for example, references 4 and 6). This signal processing device 13 produces a synthetic echo signal ê(i) in digital form, which is converted by a digital-toanalog converter 14 into a time continuous and amplitude discrete signal ê(t), this latter signal being converted by an analog low-pass filter 15 into a time-continuous and amplitude-continuous signal ē(t) or, as it is sometimes called, analog signal. This analog synthetic echo signal ē(t) is applied to a combining circuit 16 and subtracted from the signals in the receive path 2. A residual signal $r(t)=s(t)+e(t)-\bar{e}(t)$, which comprises a residual echo $e(t)-\bar{e}(t)$, whose amplitude is very small, now appears at the output of the combining circuit 16. This residual signal is applied to the pulse regenerator 10.

For the purpose of adjusting the signal processing device 13 an adjusting device 17, to which a control signal, originating from a control signal generator 18 is applied in digital form, is connected to the signal processing device 13. Paragraph E(2) gives a more detailed description of a possible construction of the signal processing device 13 and the adjusting device 17.

The control signal generator 18 comprises a high-pass filter 19 to which the residual signal r(t) is applied and which produces an analog output signal r̄(t). This signal r̄(t) is applied to a sampling device 20 producing samples r̄(i) for r̄(t). Herein i represents the number of the sample. The samples thus obtained are applied to an analog-to-digital converter 21, which converts each sample r̄(i) into a number r̂(i) in base-2 code. These numbers r̂(i) constitute the digital control signal applied to the adjusting device 17.

The sampling device 20 is controlled by sampling pulses derived by means of a frequency multiplier 22 from the clock pulses applied to the data source 7. This multiplier 22 has a multiplying factor M, so that the sampling pulses occur with a frequency M/T. Hereinafter it will be assumed that M is an integer greater than or equal to one.

(2) Signal processing and adjusting device

Figure 2:
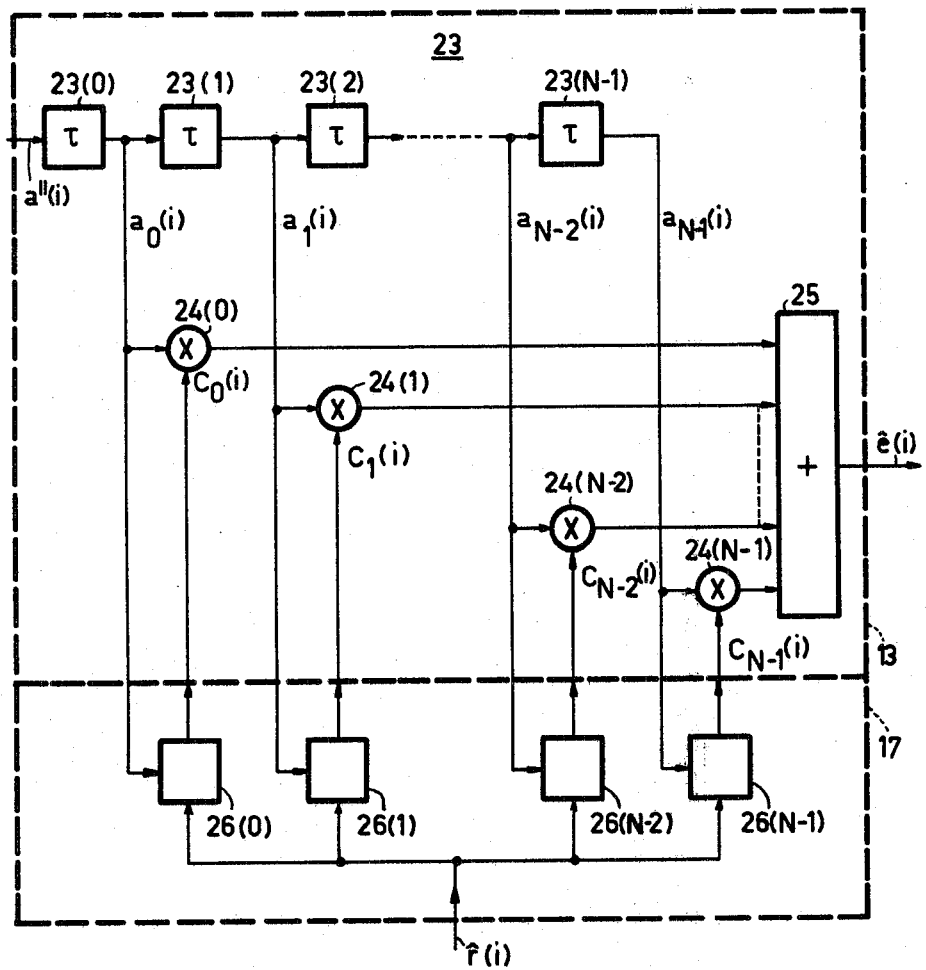
FIG. 2 shows an embodiment of an adjustable signal processing device and an adjusting device.

An embodiment of a signal processing device 13 for use in the echo canceller 2 is shown in FIG. 2. This signal processing device 13 comprises a shift register 23 to which data symbols are applied, which are here denoted by a″(i). This shift register 23 includes N shift register elements 23(0), 23(1) ... 23(N−1), each having a time delay τ. Hereinafter the shift register element having the number q will be denoted by 23(q), q this being equal to a number of the set 0, 1, 2, ... N−1. This shift register element 23(q) produces the data symbols $a_q(i)$, which are applied to a multiplying device 24(q) of a system of N multiplying devices 24(0), 24(1), ... 24(N−1). A coefficient $c_q(i)$ of a set of N coefficients $c_0(i), c_1(i), \ldots c_{N-1}(i)$ is also applied to this multiplying device 24(q). These coefficients $c_q(i)$ are generated by the adjusting device 17. The N products which are simultaneously produced by the N multiplying devices 24(q) are added together in an adding device 25 and the sum of these N products becomes available at the output of this adding device 25 in the form of a synthetic echo signal sample ê(i).

As mentioned above, the coefficients $c_q(i)$ are produced by the adjusting device 17 which is provided, for that purpose, with N correlation circuits 26(0), 26(1), .. . 26(N−1), wherein the correlation circuit having number q will be denoted by 26(q). Applied to the correlation circuit 26(q) are the digital output signal r̂(i) of the analog-to-digital converter 21, as well as the output signal $a_q(i)$ of the shift register element 23(q).

Figure 3:
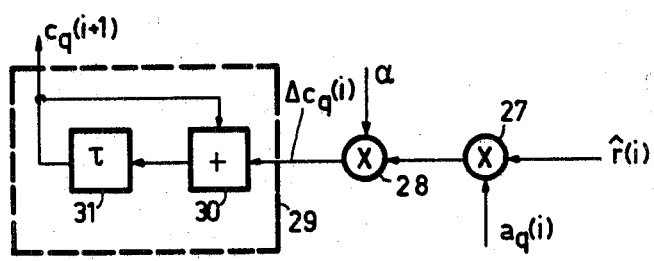
FIG. 3 shows in greater detail an embodiment of a correlator circuit for use in the adjusting device of FIG. 2.
Figure 4A:
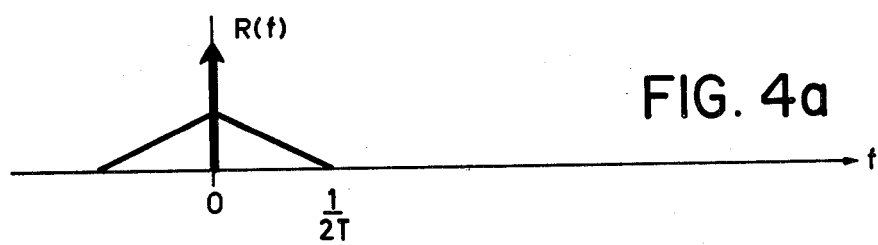
FIG. 4 shows some frequency spectra to explain the operation of the transmission system shown in FIG. 1.
Figure 4B:
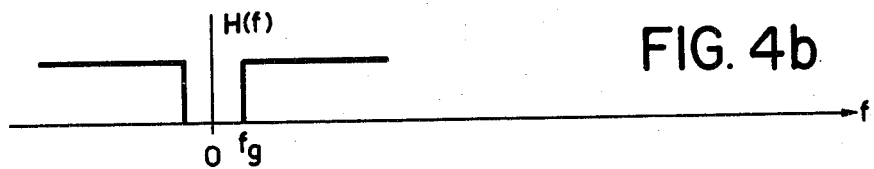
Figure 4C:
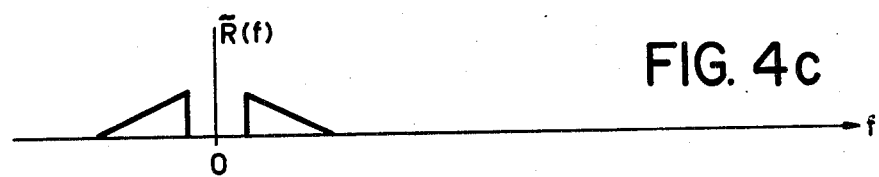
Figure 4D:
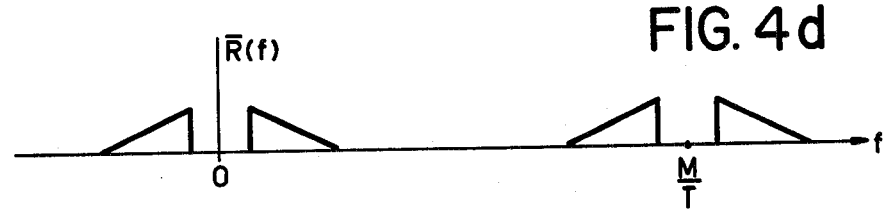

FIG. 3 shows in greater detail an embodiment of the correlation circuit 26(q). This correlation circuit comprises a multiplier 27 to which the digital output signal r̂(i) of the analog-to-digital converter 21 as well as the data symbols $a_q(i)$ are applied. The product thus obtained is multiplied in a second multiplier 28 by a factor of α, whose absolute value is smaller than unity, for generating a product which will be denoted by $\Delta c_q(i)$ and indicates the amount by which $c_q(i)$ must be changed in order to further reduce the residual echo $e(t)-\bar{e}(t)$. These numbers $\Delta c_q(i)$ are applied to an accumulator 29 which is formed in known manner by an adder 30 and a delay device 31 having a time delay τ. In response to the number $\Delta c_q(i)$ applied thereto the accumulator produces the coefficient $c_q(i+1)$ which is equal to $c_q(i)+\Delta c_q(i)$.

If it is now, more particularly, assumed that $c_q(0)=0$, then it holds that:

$$c_q(i+1) = \sum_{n=0}^{i} \alpha \hat{r}(n) a''(n-q) \quad (1)$$

wherein $a''(n-q)=a_q(n)$.

It now further holds that:

$$\bar{e}(i) = \sum_{q=0}^{N-1} c_q(i) a''(i-q) \quad (2)$$

If it is now assumed that the residual signal r(t) is applied directly to the sampling device 20 so that it then holds that:

$$\hat{r}(n)=s(n)+e(n)-\bar{e}(n) \quad (3)$$

Then it can be written for expression (1):

$$c_q(i+1) = \sum_{n=0}^{i} \alpha s(n) a''(n-q) + \quad (4)$$

$$\sum_{n=0}^{i} \alpha\{e(n) - \bar{e}(n)\} a''(n-q)$$

As s(n) and a″(n) are uncorrelated, so that it holds that:

$$\lim_{i \to \infty} \sum_{n=0}^{i} \alpha s(n) a''(n-q) = 0 \quad (5)$$

it approximately holds for high values of i that:

$$c_q(i+1) = \sum_{n=0}^{i} \alpha \{e(n) - \bar{e}(n)\} a''(n-q) \quad (6)$$

From expression (6) it follows that the coefficient $c_q(i+1)$ is predominantly determined by the residual echo $e(n)-\bar{e}(n)$. As this echo canceler is arranged to reduce the residual echo $e(n)-\bar{e}(n)$ to zero, drift and offset phenomena do not affect the quality of the residual signal. This can be explained as follows.

Drift and offset phenomena may be considered to be a direct current signal p(t) which, as shown schematically in FIG. 1, is added to the residual signal. So this residual signal can be expressed as:

$$r(t)=s(t)+p(t)+e(t)-\bar{e}(t) \quad (7)$$

It now follows from the expressions (4), (5) and (7) that for sufficiently high values of i it holds that:

$$c_q(i+1) = \alpha \sum_{n=0}^{i} p(n) \, a''(n-q) + \alpha \sum_{n=0}^{i} \{e(n) - \tilde{e}(n)\} a''(n-q) \tag{8}$$

As the data signal $a''(n)$ in its generality does not comprise a direct current term, values for i can be found, so that for a constant value of $p(t)$ it holds that:

$$\sum_{n=0}^{i} p(n) \, a''(n-q) = 0 \tag{9}$$

If, however, the data signal does comprise a direct current term, expression (9) cannot be fully satisfied. The direct current signal $p(n)$ will now furnish a contribution to $c_q(i+1)$. The signal processing device 13 will now so adjust itself that the synthetic signal $e(t)$ becomes approximately equal to:

$$e(t) = e(t) + p(t)$$

so that the residual signal $r(t)$ is approximately equal to $s(t)$. Thus, drift and offset phenomena do not substantially exercise any influence on the quality of the residual signal $r(t)$ which, ideally, is accurately equal to $s(t)$. Although drift and offset phenomena do not affect the setting of the signal processing device 13 or are cancelled by the synthetic echo signal, it became apparent from experiments that these phenomena may cause a drastic reduction in the quality of the residual signal. It appears that this is to be ascribed to the fact that the data signal $a(k)$, applied to the echo canceller, may contain a long train of data symbols of the same type. Namely, such a train causes all the data symbols stored in the shift register 23 of the signal processing device 13 to be mutually equal during several sampling periods. Due to the presence of the first term in (8), all coefficients then change by an equal amount into the same direction. From the following it will be apparent that this reduces the quality of the residual signal.

Let it be assumed that $r(t)$ is again directly applied to the sampling device 20, so that $\tilde{r}(t) = r(t)$ and that the N data symbols $a''(n-q)$ stored in the shift register 23 are all equal to $+1$ and remain so for all values of n for which it holds that $n_1 \leq n \leq n_2$. The coefficients which were calculated in the sampling period $n_1 - 1$ will now be represented by $c_q(n_1 - 1)$.

If now $p(n) = 0$ for all values of n then it follows from (2) that in the sampling period $n_1 + k + 1$, wherein $0 \leq k \leq n_2 - n_1 - 1$, a synthetic echo signal sample $\tilde{e}(n_1 + k + 1)$ is determined in accordance with $$\tilde{e}(n_1 + k + 1) = \sum_{q=0}^{N-1} c_q(n_1 + k + 1) = \tilde{e}(n_1 + k) + \alpha N \{e(n_1 + k) - \tilde{e}(n_1 + k)\} \tag{10}$$

If, from the sampling period $n_1$ onwards, the direct current component $p(n)$ also assumes a constant value, but differing from zero, it follows from (2), (8) and (10) that in the sampling period $n_1 + k + 1$ a synthetic echo signal sample $\tilde{e}'(n_1 + k + 1)$ is determined for which it holds that:

$$\tilde{e}'(n_1 + k + 1) = \tilde{e}(n_1 + k + 1) + \alpha N(k+1) p(n) + p(-n) O(\alpha^2 N^2) \tag{11}$$

In (11) $O(\alpha^2 N^2)$ represent a polynomial in $\alpha^2 N^2$. In practice this quantity is negligible relative to $\alpha N$. From (11) it follows that in response to the presence of $p(n)$ and the presence of the data symbols $a_q(n)$, which are all $+1$, the synthetic echo signal sample occurring in the sampling period $n_1 + k + 1$ exceeds by an amount of $\alpha N(k+1) p(n)$ the synthetic echo signal sample which would have been generated if no drift and offset phenomena were present. In order to cancel out these drift and offset phenomena, the residual signal $r(t)$ is not applied directly, as shown in FIG. 1, to the sampling device 20 but via a high-pass filter 19, which suppresses the low-frequency signal components in the residual signal and, consequently, also the direct current components which are a result of drift and offset phenomena. The operation of this high-pass filter is schematically shown in FIG. 4. More particularly, in this FIG. 4, there is shown schematically at a the frequency spectrum $R(f)$ of the residual signal $r(t)$, which has a strong direct current component $p(t)$. The transfer function $H(f)$ of an ideal high-pass filter is shown schematically at b and the frequency spectrum $\bar{R}(f)$ of the output signal $\bar{r}(t)$ of the high-pass filter 19 is shown at c. Applying this signal $\bar{r}(t)$ to the sampling device 20 produces an output signal $\bar{r}(i)$ having the frequency spectrum $\bar{R}(f)$, which is shown at d in FIG. 4.

(3) Modifications

1. As is apparent from FIG. 4, the signal $\bar{r}(i)$ and, consequently, also the control signal $\bar{r}(i)$ does not contain low-frequency components and also no frequency components near multiples of the sampling frequency M/T. The frequency spectrum shown at d in FIG. 4 can also be obtained by using a digital high-pass filter instead of an analog high-pass filter in the location shown in FIG. 1 and by passing the control signal $\bar{r}(i)$ to the adjusting device via this digital high-pass filter instead of directly, as shown in FIG. 1.

2. The absence of the frequency components, shown sub point 1, which are related to low-frequency components in the residual signal $r(t)$, results in the adjustment of the signal processing device not being co-determined by these usually relatively strong low frequency components. This drawback can be eliminated in a particularly simple manner, namely by removing the low-pass filter 15 from the echo canceler shown in FIG. 1 and by applying the output signal $\hat{e}(t)$ of the digital-to-analog converter 14 directly to the combining device 16.

Figure 5:
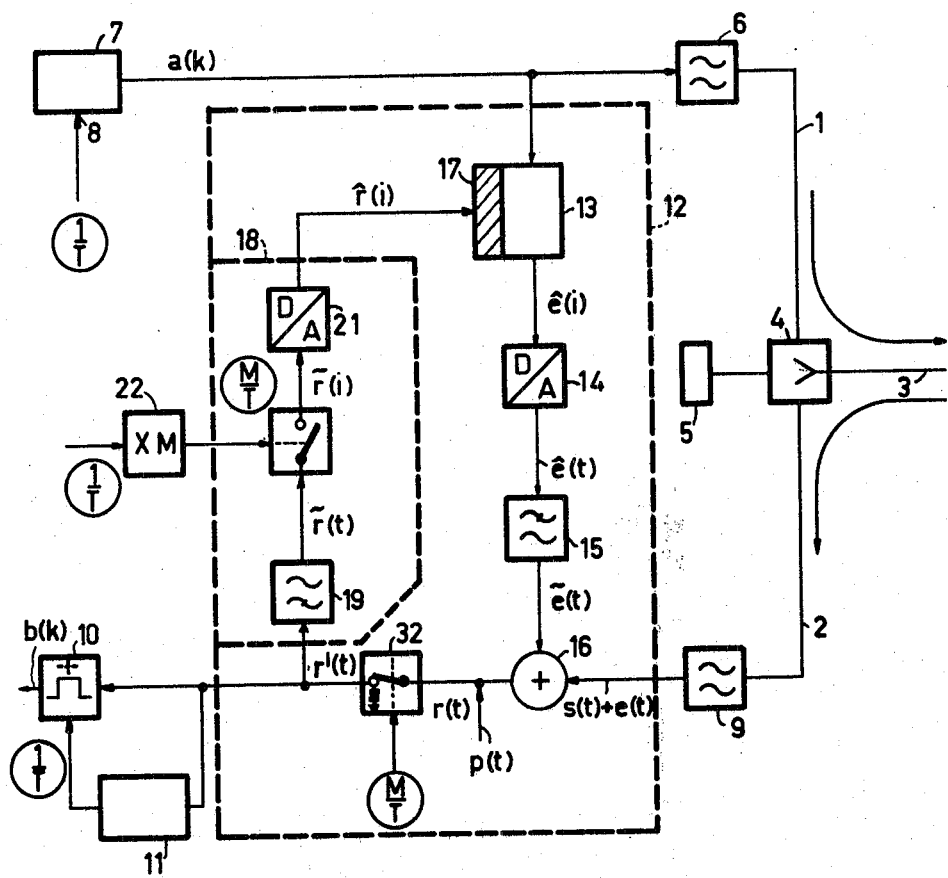
FIG. 5 shows a modification of the transmission system shown in FIG. 1.
Figure 6A:
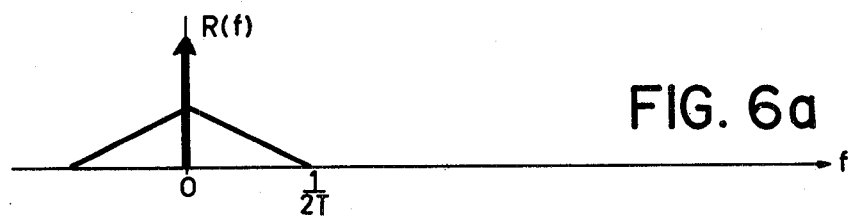
FIG. 6 shows some frequency spectra to explain the operation of the transmission system shown in FIG. 5.
Figure 6B:
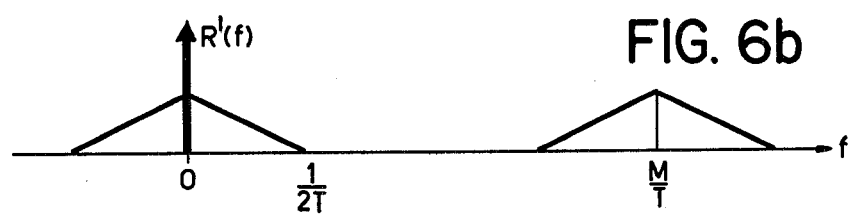
Figure 6C:
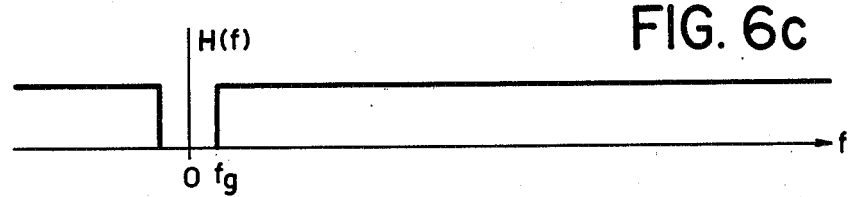
Figure 6D:
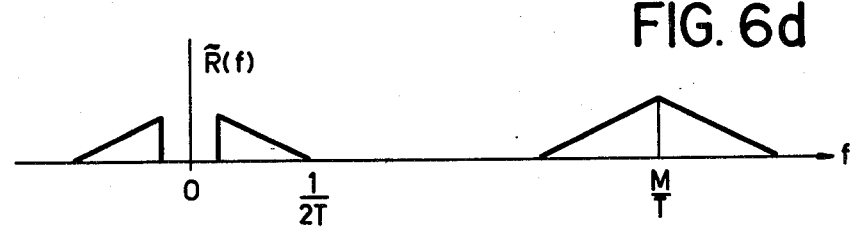
Figure 6E:
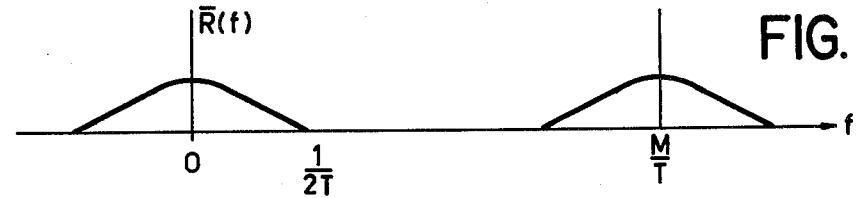

3. A further possibility to obtain low frequency signal components of the residual signal, the components caused by drift and offset phenomena excepted, in the control signal $\bar{r}(i)$ is shown in FIG. 5. Therein there is included between the output of the combining device 16 and the input of the high-frequency filter 19 a device 32 which is sometimes called "track and hold" and is controlled by clock pulses occurring at a frequency M/T. The operation of such a "track and hold" device is as follows.

Within a sampling period T/M a sample of the signal $r(t) = p(t) + s(t) + e(t) - \tilde{e}(t)$ is retained for a predetermined period of time $\theta$ and during the remainder of the period, the signal $r(t)$ is tracked. When the output signal of this "track and hold" device 32 is indicated by $r'(t)$, the operation of this device can be mathematically expressed as follows.

$$r'(t) = r(mT/M) \text{ for } mT/M \leq t \leq \theta + mT/M$$

-continued $$= r(t) \quad \text{for all further values of } t$$

$$m = 0, \pm 1, \pm 2, \ldots$$

For the direct current component p(t) this "track and hold" device 32 may be considered as a through-connection. By way of illustration, the frequency spectrum R(f) of the residual signal r(t), which comprises a strong direct current component p(t), is shown in FIG. 6 at a. The frequency spectrum R'(f) of the output signal r'(t) of the device 32 is shown schematically at b. The transfer function H(f) of an ideal high-pass filter is shown schematically at c. In response to the signal r'(t) this high-pass filter 19 supplies an output signal r̃(t), the frequency spectrum R̃(f) of which is shown at d in FIG. 6. Finally, the frequency spectrum R̃(f) of the time-discrete control signal r̃(i) is shown at e in FIG. 6.

4. As will be apparent from a comparison of the FIGS. 4 and 6, the high-pass filter 19 used in the configuration shown in FIG. 1 or described as the first modification (see the above point 1) must have a low cut-off frequency $f_g$. In the configuration described in the preceding points 2 and 3 and shown in FIG. 5, a considerably high value is permissible for this cut-off frequency $f_g$. Even a value for $f_g$ equal to M/2T is satisfactory.

(4) General remarks

Figure 7:
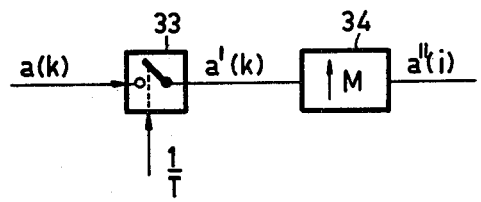
FIG. 7 shows schematically an input circuit of the signal processing device when the sampling frequency of the residual signal is M-times higher than the symbol rate.

1. Should the multiplying factor M in the transmission systems shown in the FIGS. 1 and 5 be chosen greater than unity, the time delay $\tau$ of the shift register elements 23(q) (see FIG. 2) and the time delay of the delay device 30 (see FIG. 3) becomes equal to T/M and the control signal samples r̃(i) occur with a rate M/T. Now, the data symbols a(k) cannot be directly applied to the shift register 23 but they must be converted in an input circuit into auxiliary data symbols a"(i), occurring at a rate M/T. This input circuit can be formed, in a manner described in reference 4, by a M-position switch. However, in the digital signal processing technology it is customary to implement this input circuit in the manner shown schematically in FIG. 7. Therein, the data symbols a(k) are sampled by means of a sampling device 33 and the samples thus obtained are applied to an interpolator 34. Sampling pulses occurring with a frequency 1/T are applied to the sampling device. Thus, this sampling device 33 produces only at the instant kT a signal sample a'(k) the value of which is equal to a(k). These signal samples a'(k) are applied to the interpolator 34, which is arranged to insert M−1 zero-valued samples between each two consecutive samples a'(k), (see reference 7). At the output of this interpolator there now occurs the digital signal a"(i) for which it holds that:

$$a''(i) = a'(i/M) \text{ for } i = 0, \pm M, \pm 2M, \ldots$$

$$= 0 \quad \text{for all further values of } i.$$

As already mentioned in reference 7, the cascade arrangement of the interpolator 34 and the digital filter, which functions as the signal processing device 13 is called interpolating digital filter. In practical embodiments of an interpolating digital filter the function of the interpolator and of the digital filter are interwoven. For the implementation of an interpolating digital filter reference is made to the references 8, 9 and 10.

2. FIGS. 1 and 5 show a construction of a so-called base-band data modem. Herein the data symbols a(k) are applied to a low-pass filter 6 before they are applied to the hybrid 4.

In addition to this base-band data transmission speech-band data transmission is also known. In that case a modulation device which ensures that the data signal applied to the hybrid 4 is located in the frequency band from 300–3400 Hz must be included between the data source 7 and the filter 6.

3. If the above-mentioned modulation device is provided in the transmit path between the output of the data source 7 and the point where the signal processing device 13 is connected to the transmit path, it will usually be necessary to provide an analog-to-digital converter producing multi-bit code words at the cascade arrangement of sampling device 33 and interpolator 34, shown in FIG. 7.

4. Alternatively, the above-mentioned modulation device may be provided in the transmit path between the point where the signal processing device 13 is connected to this transmit path 1 and the filter 6. In these circumstances also the signal processing device 13 will have to perform a modulation process. This signal processing device can then be constructed in the manner described in reference 4, or as described in reference 5.

5. A linear coding network, for example a biphase coder, may be provided between the point where the signal processing device 13 is connected to the transmit path 1 and the filter 6.

What is claimed is:

1. An echo canceler comprising:
    an adjustable signal processing device connected to a transmit path of a transmission system;
    combining means connected to a receive path of the above-mentioned transmission system for combining signals occurring in the receive path with signals produced by the signal processing device for generating a residual signal;
    adjusting means which are responsive to a control signal for adjusting the signal processing device,
    means responsive to the above-mentioned residual signal for generating the said control signal and comprising means for converting the residual signal into a digital signal;
    characterized in that the said control signal generating means comprise high-pass filter means arranged in cascade with the converting means.

2. An echo canceler as claimed in claim 1, characterized in that a sample and hold circuit of the "track and hold" type is included between the combining means and the control signal generating means.

* * * * *